Sept. 7, 1943.        E. W. SHERRARD        2,328,853
DEVICE FOR INDICATING THE CONCENTRATION, DENSITY
AND DILUTION OF LIQUIDS AND SOLUTIONS
Filed Oct. 30, 1941        2 Sheets-Sheet 2
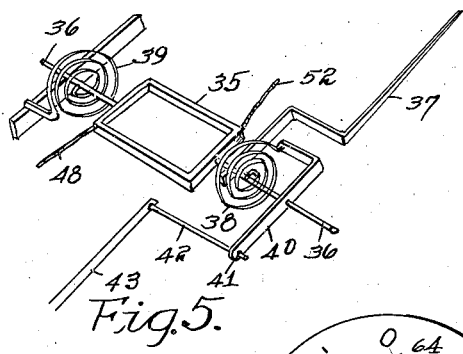
Fig.5.
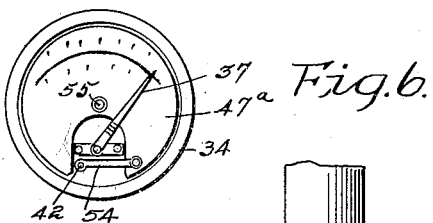
Fig.6.
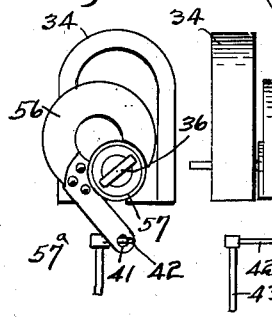
Fig.9.
Fig.8.
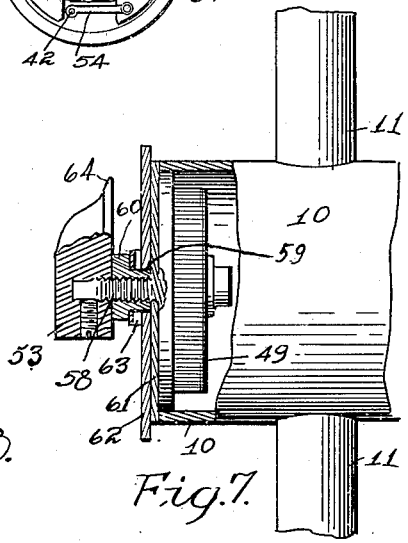
Fig.7.
Fig.10.
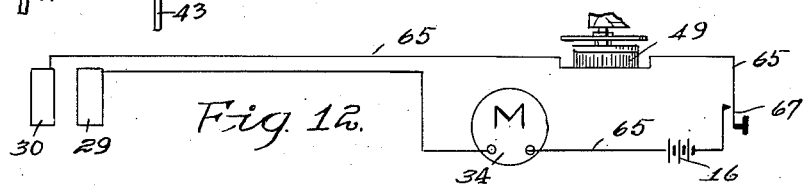
Fig.12.
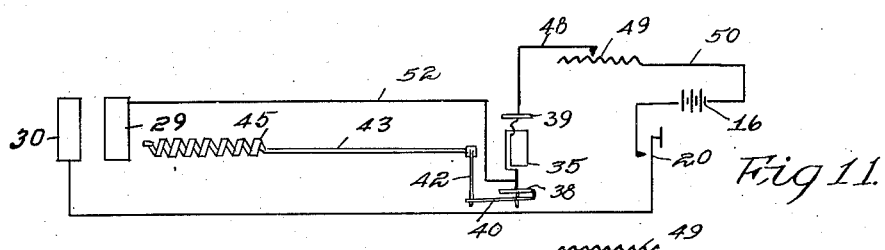
Fig.11.
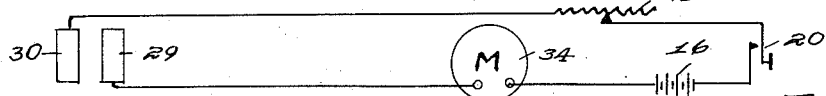
Fig.13.
Inventor
Elwin W. Sherrard.
by Ennig & Hague
Attys Patented Sept. 7, 1943

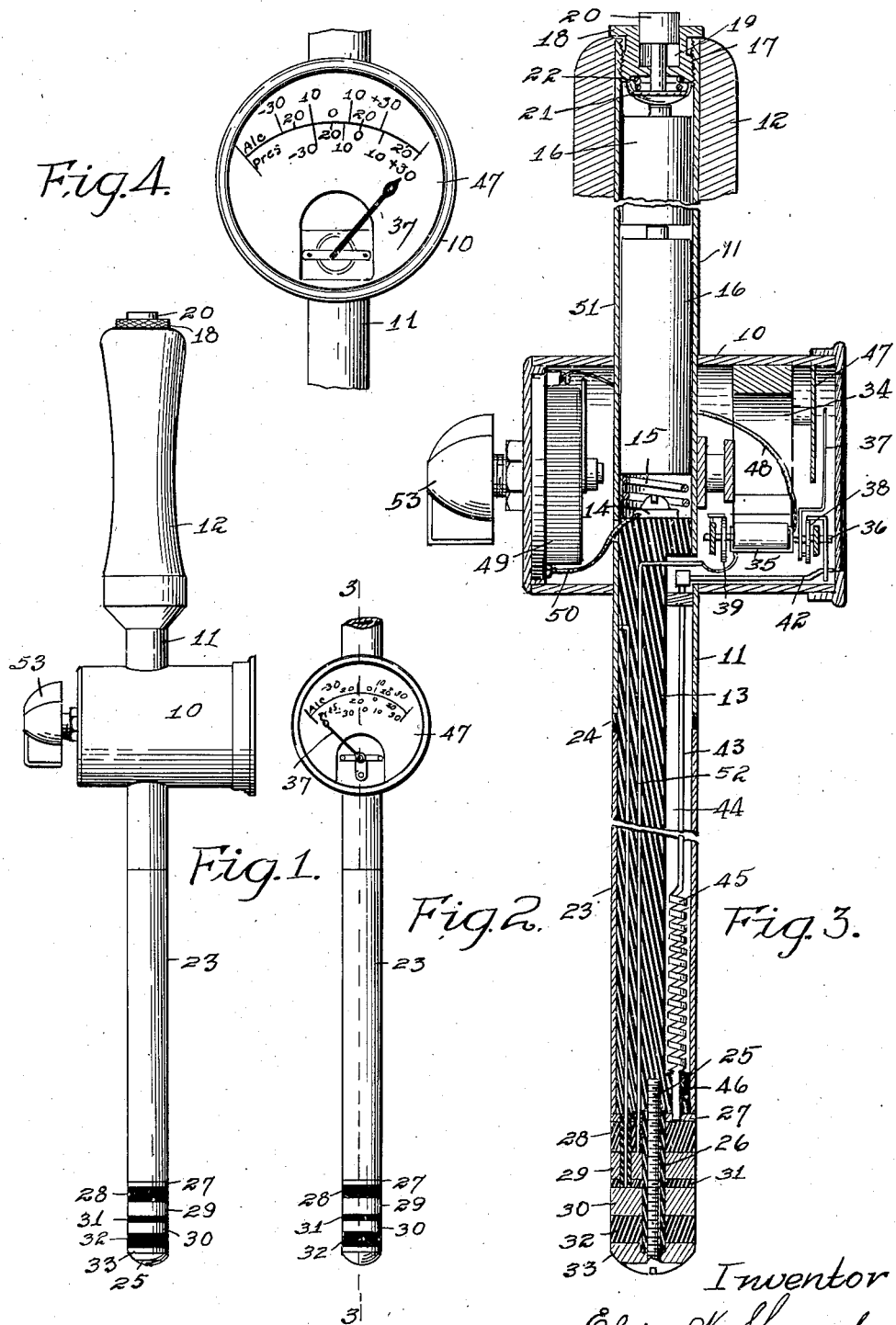

2,328,853

UNITED STATES PATENT OFFICE 2,328,853

DEVICE FOR INDICATING THE CONCENTRATION, DENSITY, AND DILUTION OF LIQUIDS AND SOLUTIONS

Elwin W. Sherrard, Lincoln, Nebr.

Application October 30, 1941, Serial No. 417,124

3 Claims. (Cl. 175—183)

This invention relates to an instrument for quickly and accurately determining the freezing temperature of anti-freeze liquids such as are used in the cooling radiators of an automobile and which may also be used for determining the concentration, density or dilution of a mixture of different kinds of liquids by suitable calibration of the instrument.

Heretofore, the information as to the temperature at which anti-freeze liquids will freeze has been obtained in a more or less inaccurate manner by means of the hydrometer, an instrument for determining the specific gravity of the liquid being tested. The use of the hydrometer is not very desirable due to the fact that a careless operator in too hastily filling a hydrometer casing with solution causes bubbles to form on the float and thus change the buoyancy of it, thus making the readings unreliable. A further difficulty encountered with a hydrometer which is eliminated by use of this device is the clouding of the casing of the hydrometer due to dirty solution which renders it very hard to read. The indicating dial of my improved device never comes in contact with the solution tested, and, hence, is left clean and easy to read, and, further, the use of the hydrometter is undesirable owing to the fact that the readings are inaccurate due to the temperature variations in the liquids, from the temperature at which the hydrometers are calibrated, and further to the fact that any film forming on the bulb of the hydrometer will increase its weight, further detracting from its accuracy, with the result that the attendant selling the anti-freeze solution does not know how much liquid to add to properly safeguard the radiator.

It is, therefore, an object of my invention to provide an improved instrument to be used for testing the cooling liquid in an automobile radiator to determine its freezing temperature and to indicate the same in freezing temperatures, wherein an attendant may easily, quickly and accurately determine the freezing temperature.

More specifically, it is the object of my invention to provide a device for testing freezing temperatures of anti-freeze liquids and for determining the densities and concentration of other liquids, based on the principle that the electrical conductivity of one liquid is different from the conductivity of the anti-freeze solution used therein and others, and also varies as their densities. As an illustration: If alcohol is used as an anti-freezing solution, the electrical resistance of alcohol is greater than that of water, and it will be seen that if the proportion of alcohol to water is increased, the resistance of the liquid will also be proportionately increased and the conductivity of the fluid decreased. Thus, the amount of alcohol in the mixture may be determined by measuring the conductivity of the liquid by means of an electric current at a given temperature, and at a predetermined voltage. However, the conductivity of the liquid will also vary with its temperature, the resistance decreasing as the temperature is increased.

It is, therefore, a further object to provide a suitable device wherein an electric current may be caused to pass through a portion of the liquid being tested, at a constant and predetermined voltage, together with means for accurately indicating the current flow in terms of freezing temperature, or in concentration or density, and further to provide in said instrument means for compensating for the increased current flow due to temperature changes, if a dry battery is used for current supply, also to provide means for maintaining a constant voltage in the circuit to compensate for the voltage drop caused by use of the consuming of the active elements of the battery, and also to compensate for any inherent resistant variation in the circuit that may occur due to corrosion of any connection of the conductors and in the working elements of the adjustable resistance.

A further object of my invention is to provide a testing device of the type above described, of improved construction, wherein the various instruments are carried in a tight casing for their protection, of compact form having a suitable handle whereby the device may be easily manipulated, and with a long and narrow contracted portion for supporting the electrodes used for making contact with the fluid, in such a manner that they may be easily and quickly inserted in the filling opening of a cooling radiator and into the fluid to be tested, and wherein said narrow and contracted portion and the electrodes may be quickly and easily wiped off to prevent adhesion of conductive substances from collecting on the electrodes and the insulation therebetween.

My invention consists in the construction, arrangement and combination of the various parts of the device whereby the objects contemplated are attained, as hereinafter more fully set forth, pointed out in my claims, and illustrated in the accompanying drawings, in which:

Figure 1 is a side elevation of my improved device;

Figure 2 is a front view of the same with the handle portion removed;

Figure 3 is an enlarged vertical and segmental sectional view taken on the line 3—3 of Figure 2, showing the interior construction of the device;

Figure 4 is an enlarged view of the dial and the indicating needle showing the needle in position for taking a reading;

Figure 5 is a diagrammatical perspective view of the armature winding of the galvanometer, together with the hair springs for bringing the armature to zero position, and the mechanism for controlling the tension of one of the hair springs used in connection with the temperature control by compensation in current variation due to temperature changes in the liquid being tested;

Figure 6 illustrates a modified form of mounting the dial wherein the temperature compensation is accomplished by movement of the dial relative to the indicating needle rather than by varying the control of the movement of the needle;

Figure 7 illustrates a modified form of my device wherein the automatic temperature control is eliminated and wherein a manually controlled dial is provided to be used in connection with a variable resistance;

Figure 8 illustrates the face of said dial;

Figure 9 is a side elevation illustrating diagrammatically another form of my device for providing magnetic correction in reading of the indicating needle in conjunction with the calibration with the freezing temperature scale;

Figure 10 is an end elevation of the mechanism illustrated in Figure 9;

Figure 11 is a wiring diagram used in connection with my preferred form of device, including an automatic device for controlling the reading due to temperature changes in the fluid being tested;

Figure 12 is a wiring diagram of the modified form illustrated in Figure 7; and

Figure 13 illustrates an electrical circuit wherein the device may be used for the purpose of determining the temperatures of the fluids by proper calibration of the indicating dial.

My improved device comprises a suitable casing including a cylindrical portion 10 formed of any suitable material, and a transversely arranged tubular member 11 which is passed diametrically through the body 10 and fixed thereto. One end of the member 11 extends upwardly and is provided with a handle 12 formed of wood or some other material. The lower end of the tubular member 11 has mounted therein the upper end of a bar 13 formed of insulating material, having its upper end terminating within the body 10 and provided with an electrical contact 14, a spring 15 being supported on the upper end of the member 13 and surrounding the contact 14 and designed to support a number of dry cells 16 within the upper end of the member 11, the upper end of the member 11 having a threaded portion 17 for receiving a plug 18 provided with a cavity 19 in its upper end for receiving a push button 20 having at its lower end a contact member 21 designed to engage the upper end of the cell 16, a light spring 22 being provided for yieldably holding the member 21 in contact with the electrode of the cell 16. By this arrangement it will be seen that if downward pressure is applied to the member 20, then the battery 16 will be moved downwardly, causing the lower one of the cells to engage the contact member 14 and to close the electric circuit hereinafter described.

The lower end of the member 13 is provided with a metallic shell 23 for the purpose of strengthening the member 13, said shell being insulated from the member 11 by a flange 24 formed in the member 13, the lower end of the member 13 having a screw-threaded opening for receiving a screw 25 on which is mounted a sleeve 26 formed of insulating material. Mounted on the sleeve 26 is a disc 27 adjacent the lower end of the member 13. Adjacent to the disc 27 is a disc 28 of insulating material, and adjacent to the lower surface of the member 28 are electrodes 29 and 30 supported by an insulating disc 31, an insulator 32 being mounted adjacent to the member 30, all of said discs being supported and fixed to the lower end of the member 13 by a set screw 25 and a disc 33.

Supported within one end of the body 10 is a galvanometer 34, substantially of ordinary construction, having an armature coil 35 mounted on pivots 36, one of said pivots supporting an indicating needle 37 and a hair spring 38, the other pivot supporting a hair spring 39 wound in the opposite direction from the spring 38, wherein the coil 35 and the member 37 may be moved to zero position by adjusting the tension of said springs, one end of the spring 38 being connected to a bar 40 pivoted on the member 36, the free end of said bar 40 having an opening 41 for receiving one end of a lever 42 carried on the upper end of a shaft 43 supported in a longitudinal groove 44 formed in the member 13, the shaft 43 being connected to the upper end of a bimetallic thermostat device 45 having its lower end fixed by means of a pin 46, in the member 27, the said thermostat 45 providing means for controlling the movement of the member 37 due to temperature variations in the liquid. A dial 47 is provided beyond the member 37 and is preferably graduated to read in freezing temperatures, or appropriately calibrated for any other purpose for which the device is to be used.

The coil 35 is connected in an electric circuit including a conductor 48, a variable resistance 49, a conductor 50, a battery 16, a switch 20, and a conductor 51, including the member 11, an electrode 30, an electrode 29, a conductor 52 making connection with the other end of the coil 35, the resistance 49 having a knob 53 for controlling its adjustment. The needle 37 is designed to rest normally in zero position in the left-hand or minus end of the graduation, as illustrated in Figure 2.

When it is desired to obtain a reading with my improved device the electrodes 29 and 30 are inserted in water at normal temperatures, to a sufficient depth wherein the thermostat 45 is below the level of the liquid. As soon as the device has been inserted the button 20 is depressed to force the battery 16 downwardly and make contact with the member 14, closing the electric circuit and causing a deflection of the needle 37. The knob 53 is then grasped and the resistance of the circuit varied until the needle 37 assumes the position illustrated in Figure 4 to a reading of plus 30, near the freezing temperature of water. The device is now adjusted and in condition to be inserted in the liquid to be tested.

In this connection it will be observed that any variation in the resistance of the electric circuit and any variations in the battery voltage is taken care of by this adjustment. If the device is to be used in the testing of a liquid in which alcohol has been added, then in view of the fact that the resistance of the liquid is now greater than the resistance of water, it will readily be seen that reading of the galvanometer will be in a minus direction, or from freezing towards zero. If the instrument is now inserted in the anti-freeze liquid and the button 20 again depressed, after the instrument has remained in the liquid a few seconds so that the thermostat 45 is influenced by the temperature of the liquid, then the needle 47 will again be deflected to the left, and any variations in the conductivity of the liquid caused by temperature changes will be differentiated by means of the thermostat 45, the lever arm 42 and the lever 36, changing the tension on the spring 38, thereby providing means wherein the freezing temperature of the liquid will be easily, quickly and accurately ascertained, regardless of the temperature of the liquid and regardless of the voltage condition of the battery within certain limits. The dial 47 may be graduated or calibrated, wherein the device may be used in connection with the testing of anti-freeze solutions of different kinds, the upper graduation of Figure 4 being used when a liquid employing alcohol is being tested, while the lower graduation may be used when the liquid commercially known as Prestone is being tested, or if the device is used in connection with the testing of densities or conductivity of liquids wherein their conductivity to density varies in reverse order from that above stated, then the needle is adjusted to the initial position on the opposite end of the scale, or to any other predetermined starting position.

In the above described construction it will be seen that provision is made for correction of errors in the reading due to temperature changes by changing the tension of the hair spring 38. It will also be seen that this correction may be accomplished by attaching the lever 42 to one end of a link 54, illustrated in Figure 6, the other end of the link 54 being connected to the dial 47a, which in turn is pivotally mounted on the frame of the galvanometer by the pivot 55, thus providing means whereby the dial 47a may be rotated relative to the needle 37 to accomplish the correction desired.

In Figures 9 and 10 a further modified means is provided wherein the correction is controlled magnetically, a small magnet 56 being rotatably mounted on a non-magnetic sleeve 57 mounted concentrically with the pivot members 36, to shift the magnetic field of the galvanometer by simply rotating said magnet, the magnet having a lever 57a operated by the lever arm 42.

My invention also includes the use of a device of cheaper construction than the one above described, in which the thermostat 45 may be omitted, and in which the variable resistance shaft 58 as illustrated in Figure 7, is provided with a sleeve 59 formed on the nut 60 for securing the variable resistance 49 to the end 64 of the body 10.

Rotatably mounted on the sleeve 59 is a disc or dial 62 calibrated preferably in degrees of temperature. A spring 63 is provided for frictionally retaining the disc against the member 61, the end of the knob 53 having a pointer 64 by means of which the comparison with the calibration may be made, as it will readily be seen that this pointer will be moved to various positions corresponding to the adjustment of the variable resistance. The galvanometer 34, as illustrated in Figure 12, is graduated to read in freezing temperature, as before described, and included in a circuit employing conductors 65, a battery 16, a switch 67, a variable resistance 49, and the electrodes 30 and 29. In the operation of this device, as in my preferred form, the device is first adjusted by placing it in water at normal temperature to obtain the desired initial position of the needle. It is then inserted in the anti-freeze fluid to be tested, after which the temperature of said fluid may be ascertained by an ordinary thermometer. The dial 62 is then rotated to position with the zero indicia opposite the pointer 64, the resistance is again adjusted until the pointer 64 is opposite the indicia corresponding to the temperature obtained by the reading of the thermometer which provides means for including in the electric circuit an additional resistance to the amount of resistant reduction in the fluid due to the temperature increase above that of normal, wherein the reading of the needle 37 on the freezing temperature graduation is corrected.

In Figure 13 I have illustrated a circuit similar to the circuit illustrated in Figure 12 wherein the galvanometer 34 may be graduated to read in degrees of temperature, and when so graduated, the device may be utilized for reading temperatures of the fluid, inasmuch as the resistance of the fluid varies with the temperature. In the latter circuit, of course, the dial 62 is not used, the instrument, however, being adjusted by means of a variable resistance so that the needle will be deflected to a position corresponding to the temperature of the fluid in which the instrument is adjusted, said temperature being determined by a thermometer or other means. It should be made clear, however, that the primary adjustments required in all forms of this device only need to be made occasionally, say, for instance, once a day, to compensate for any variation in the battery voltage or any other variation in the inherent resistance of the circuit.

In the drawings I have illustrated the circuit being energized by dry cell batteries which are preferred due to their compactness and their ability to be easily moved around. However, it will readily be seen that wet cell batteries might be substituted with less voltage variation, or the current for operating the galvanometer might be derived from a power line with suitable flexible cord, without departing from the spirit of my invention.

Thus, it will be seen that I have provided a simple, durable and inexpensive device wherein the freezing temperatures of anti-freeze fluids used in connection with water may be easily, quickly, and accurately determined, and a device in which the density of a mixture of liquids having different electrical conductivities may be measured by the proper graduation of the galvanometer dial.

I claim as my invention:

1. In a device of the class described, a hollow and cylindrical body portion having a handle portion projecting laterally from the top side, a narrow and elongated electrode support depending from the under side of said body, a pair of spaced and insulated electrodes carried on the lower end of said support and adapted to be suspended in a liquid and short-circuited therewith, a variable resistance in one end of said body, a galvanometer in the other end of said body, including a calibrated dial and an indicator needle, a battery in said handle, a switch, electric conductors for connecting said battery, switch, variable resistance, electrodes, and galvanometer in series, a thermostat in said electrode support adapted to be actuated by temperature changes in the liquid, and means operatively connected with the thermostat for modifying the normal movement of the needle to correct any inaccurate reading of the galvanometer due to temperature changes.

2. In a device of the class described, a hollow and cylindrical body portion having a handle portion and a narrow and elongated electrode support depending from the under side of said body, a pair of spaced and insulated electrodes carried on the lower end of said support and adapted to be suspended in a liquid and short-circuited therewith, a variable resistance and a galvanometer supported in said body, said galvanometer including a calibrated dial and an indicator needle, said galvanometer having a spring tension device for controlling the movement of the needle, a battery in said handle, a switch, electric conductors for connecting said battery, switch, variable resistance, electrodes and the galvanometer in series, a thermostat in said electrode support adapted to be actuated by temperature changes in the liquid, and means operatively connecting the thermostat with said spring tension device for modifying the normal movement of the needle to correct any inaccurate readings of the galvanometer due to temperature changes.

3. In a device of the class described, a hollow body having a handle and a narrow elongated electrode support projecting laterally therefrom, a pair of spaced and insulated electrodes carried on the outer end of said support and adapted to be suspended in a liquid and short-circuited therewith, a variable resistance and a galvanometer carried in said body, said galvanometer including a calibrated dial and an indicator needle and a spring tension device controlling said needle, a thermostat in said electrode support near said electrodes, adapted to be actuated by temperature changes of the liquid, means operatively connecting the thermostat with said hair spring for modifying the normal movement of the needle to correct any inaccurate readings of the galvanometer due to temperature changes, and an electric circuit including said variable resistance, said electrodes and said galvanometer.

ELWIN W. SHERRARD.